(12) United States Patent
Woltz et al.

(10) Patent No.: US 6,931,287 B2
(45) Date of Patent: Aug. 16, 2005

(54) REMOTE CONSOLE

(75) Inventors: James Arthur Woltz, Falconer, NY (US); Daniel Joseph Maciak, Warren, PA (US)

(73) Assignee: Acu-Rite, Inc., Jamestown, NY (US)

( * ) Notice: Subject to any disclaimer, the term of this patent is extended or adjusted under 35 U.S.C. 154(b) by 366 days.

(21) Appl. No.: 10/234,028

(22) Filed: Sep. 3, 2002

(65) Prior Publication Data

US 2004/0044425 A1 Mar. 4, 2004

(51) Int. Cl.$^7$ .............................................. G05B 19/18
(52) U.S. Cl. .......................... 700/65; 700/12; 700/17; 700/84; 702/188; 715/718; 715/740; 345/77; 340/538; 340/693.1; 340/333
(58) Field of Search ...................... 700/56–59, 64–66, 700/159, 186, 11–13, 17, 20, 83, 84; 318/652, 602; 702/94, 150, 188; 175/44, 45; 96/423; 340/825.56, 854.1, 989, 991–993, 995.28, 531, 533, 538, 693.1, 3.1, 3.9, 333; 250/559.29; 715/718, 740; 345/77

(56) References Cited

U.S. PATENT DOCUMENTS 5,416,885 A * 5/1995 Sakoh ........................ 388/838
5,822,615 A    10/1998 Yamashita et al.
6,009,381 A * 12/1999 Ono ............................ 702/188
6,131,299 A * 10/2000 Raab et al. .................... 33/503
6,739,078 B2 * 5/2004 Morley et al. ................ 37/348
6,741,906 B2 * 5/2004 Walther et al. .............. 700/180

FOREIGN PATENT DOCUMENTS

JP     11146573 A  *  5/1999   ............ H02J/9/06
JP     11285171 A  * 10/1999   ............ H02J/13/00

* cited by examiner

Primary Examiner—Anthony Knight
Assistant Examiner—Crystal J Barnes
(74) Attorney, Agent, or Firm—Brinks Hofer Gilson & Lione

(57) ABSTRACT

A position display system for displaying a position of a device, the system including a device, a position measuring device that measures a position of the device and a host readout device that is mounted at a first location. The host readout device receives a signal from the position measuring device that is representative of a position of the device, wherein the host readout device includes a display that displays an image representative of the position of the device. A remote readout device that is mounted at a second location, wherein the remote readout device includes a display that displays the image.

28 Claims, 2 Drawing Sheets

REMOTE CONSOLE

BACKGROUND OF THE INVENTION

1. Field of Invention

The present invention relates to a remote console, such as a remote console used to display positional data.

2. Discussion of Related Art

It is known to measure the position of a device, such as a machine tool, by using a linear encoder or a rotary encoder, depending on the type of motion that the device follows. A readout device receives positional feedback signals from the encoder and generates positional data that is displayed on a display of the readout device. A single such readout device is mounted at such a position that the user of the device can conveniently read the display, operate the readout device and operate the device.

One disadvantage of the above described readout device is that some devices, such as some styles of metal milling machines, are very long in length and certain tasks require the user to be far from the single readout device. This large separation distance inhibits the user to either view or operate the readout device while he or she is performing a task on the device.

Accordingly, it is an object of the present invention to allow a user to view and/or operate a readout device from a location other than that of the host readout device.

Other objects of the present invention will become apparent from the following description of the present invention and embodiments thereof.

BRIEF SUMMARY OF THE INVENTION

One aspect of the present invention regards a position display system for displaying a position of a device, the system including a device, a position measuring device that measures a position of the device and a host readout device that is mounted at a first location. The host readout device receives a signal from the position measuring device that is representative of a position of the device, wherein the host readout device includes a display that displays an image representative of the position of the device. A remote readout device that is mounted at a second location, wherein the remote readout device includes a display that displays the image.

A second aspect of the present invention regards a position display system for displaying a position of a device, the system including a device, a position measuring device that measures a position of the device and a host readout device that is mounted at a first location. The host readout device receives a signal from the position measuring device that is representative of a position of the device, wherein the host readout device includes a display that displays an image representative of the position of the device. A remote readout device that is mounted at a second location, wherein the remote readout device includes a display and a keypad that controls the host readout device.

Each aspect of the present invention provides the advantage of allows a user to view and/or operate a readout device from a location other that that of the host readout device.

Additional embodiments and advantages of the present invention will become apparent from the following description and the appended claims when considered with the accompanying drawings.

DETAILED DESCRIPTION OF THE INVENTION

Figure 1:
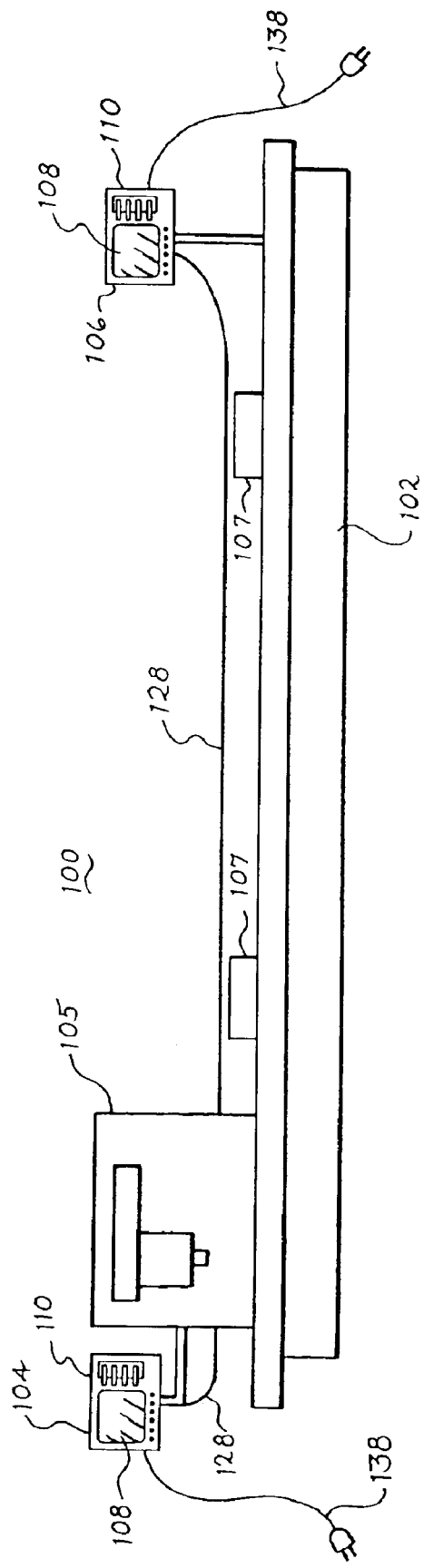
FIG. 1 schematically shows a side view of an embodiment of a system that employs a remote console in accordance with the present invention.

FIG. 1 schematically shows a position display system 100 that is employed with a large device, such as large machine tools that include milling machines, grinders, electrostatic discharge machines and a long lathe 102. The position display system 100 includes a host readout device 104 that is mounted at one position and a remote readout device 106 that is mounted at a second position that is a significant distance from the host readout device 104.

The host readout device 104 accommodates all I/O devices of the position display system 100, such as encoders, edge finders and serial ports. An example of the host readout device 104 is the PT880 Readout device to be made by Acu-Rite, Inc. of Jamestown, N.Y. The host readout device 104 is mounted at a location where encoder inputs and other I/O inputs would terminate, such as near a milling machine 105. Accordingly, the host readout device 104 receives position signals from one or more position measuring devices, such as an angular encoder or a linear encoder 107, and generates position signals that are visualized on a display 108 of the host readout device 104. It is contemplated that the host readout device 104 can receive inputs from as many as six encoders. The host readout device 104 also includes a keyboard/keypad 110 that is used to operate and/or program the host readout device 104.

Figure 2:
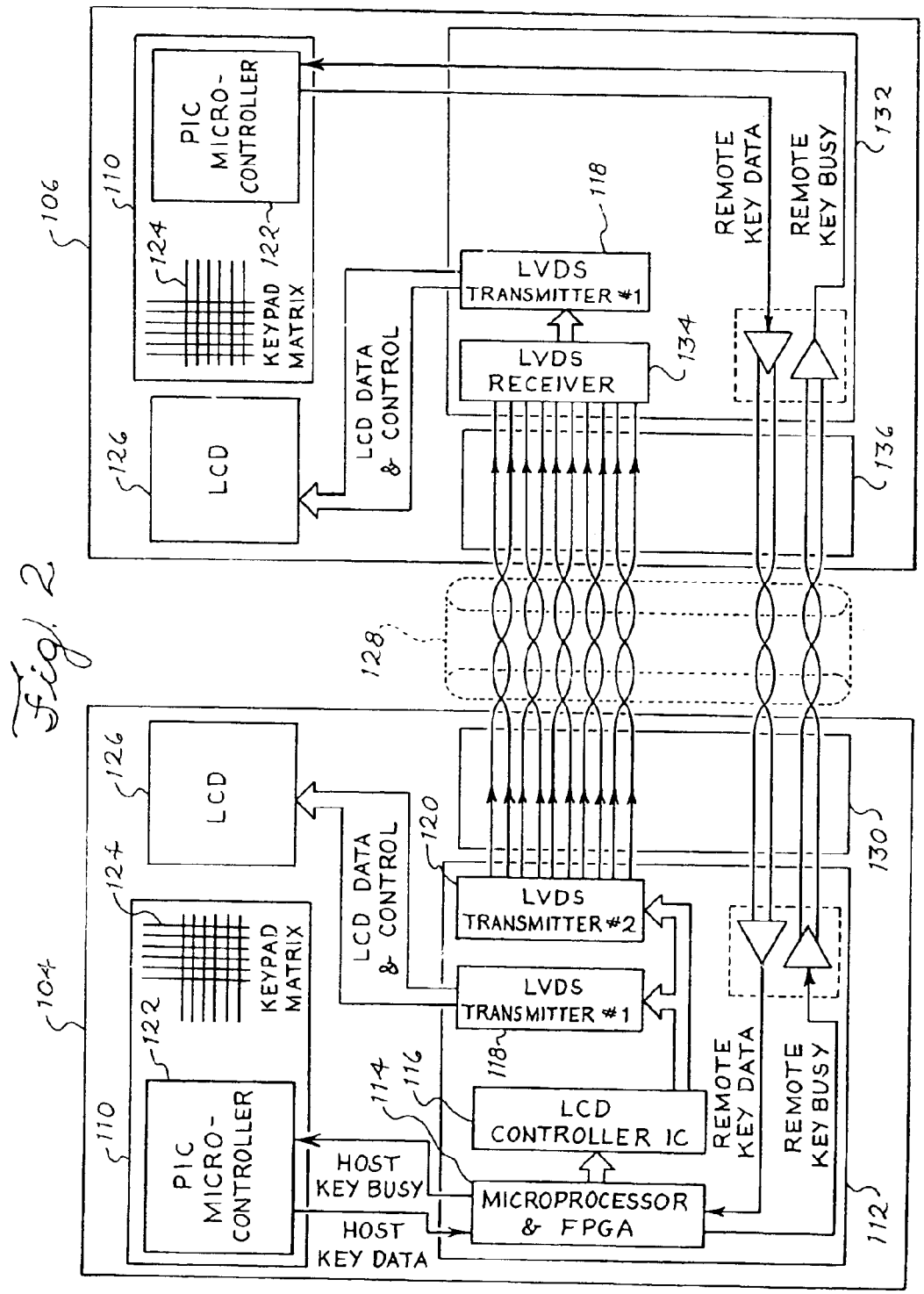
FIG. 2 schematically shows circuitry used with a primary console of the system of FIG. 1 and circuitry of the remote console used in the system of FIG. 1 in accordance with the present invention.

As shown in FIG. 2, the host readout device 104 includes a motherboard 112 with a microprocessor with SDRAM and flash memory and a Field Programmable Gate Array (FPGA) 114 that is in communication with a liquid crystal device (LCD) controller integrated circuit 116. The LCD controller integrated circuit 116 is in communication with a pair of low voltage differential signal (LVDS) transmitters 118, 120. As shown in FIG. 2, the microprocessor and FPGA 114 is electrically connected to the PIC microcontroller 122 associated with the keyboard 110. The PIC microcontroller 122 scans the keypad matrix 124 and provides the microprocessor and FPGA 114 a coded bit stream of data upon a debounced key press. The LVDS transmitter 118 is connected with an LCD 126 associated with the display 108. In addition, the microprocessor and FPGA 114 and LVDS transmitter 120 are connected to a remote video readout (VRO) interface cable 128 via an input board 130.

As shown in FIGS. 1 and 2, the interface cable 128 extends from the host readout device 104 to the remote readout device 106 that is positioned at a far end or portion of the lathe 102.

As shown in FIG. 2, the structure of the remote readout device 106 is similar to that of the host readout device 104 with several modifications. Note that where like devices are used in the two readout devices then like numerals will be used to identify those like devices. For example, the remote readout device includes a display 108 and a keyboard/keypad 110 whose functions will be described below.

As shown in FIG. 2, the remote readout device 106 includes a motherboard 132 that includes a LVDS receiver 134 that is in communication with a LVDS transmitter 118. As shown in FIG. 2, the motherboard 132 is electrically connected to the PIC microcontroller 122 associated with the keyboard 110. The PIC microcontroller 122 scans the key matrix 124 and provides the motherboard 132 a coded bit stream of data upon a debounced key press. The LVDS transmitter 118 is connected with an LCD 126 associated with the display 108. In addition, the motherboard 132 is connected to the remote VRO interface cable 128 via a remote board 136.

Motherboards 112 and 132 each are populated with its own switching power supply. Thus, both the host readout device 104 and the remote readout device 106 cannot operate unless it is supplied with its own AC power source (95-264Vac) via power cord 138. Within each of the host readout device 104 and the remote readout device 106 is a small DC cooling fan to provide internal circulation of air. Note that the fan within the host readout device 104 is controlled by the FPGA while the fan of the remote readout device 106 is on all the time while the power switch of the remote readout device 106 is turned on. For each motherboard 112 and 132, the inverter circuitry associated with each LCD 126 is the same and are each controlled by their own pulse width modulated (PWM) clock signal generated by the host motherboard 112, wherein the PWM clock signal of the remote readout device 106 forms a part of the LCD control signal group. Note that no special software is used in the remote readout device 106.

When both power cords 138 are connected with power supplies, the powering up of the various readout devices is described below in the case when the remote readout device 106 is properly interfaced with the host readout device 104. In particular, turning the power switches of both readout devices 104 and 106 allows both readout devices to function normally. Turning on the host readout device 104 while turning off the remote readout device 106 only allows the host readout device to function normally. Turning off the host readout device 104 will render both the host readout device 104 and the remote readout device 106 inoperative regardless of whether the power of the remote readout device is turned on or off. Note that connecting the remote readout device 106 to the host readout device 104 can happen at any time where no hardware or software configuration changes are necessary. However, both devices 104 and 106 need to be turned off before the cable 128 is connected. Note that the host readout device 104 detects when the remote readout device 106 is installed and in communication with the host readout device 104 via cable 128.

When both readout devices 104 and 106 are powered on, communication between each readout device is done via LVDS (Low Voltage Differential Signaling) technology via the LVDS receiver, transmitters, input board and remote board described previously. LVDS is a way to communicate data using a very low voltage swing (typically about 350 mV) differentially over a balance cable (twisted pair). Single channel data transmission at hundreds (or even thousands) of Megabits per second is obtainable while using cable lengths of >10's of meters. LVDS parameters are currently defined by two standards: TIA/EIA (Telecommunications Industry Association/Electronic Industries Association) and IEEE (Institute for Electrical and Electronics Engineering). A host of manufacturers offer off-the-shelf integrated circuits that can be used for the LVDS receiver, transmitters, input board and remote board described previously and that adhere to the LVDS standards set by the previously mentioned bodies.

Note that in each of the readout devices 104 and 106, the LCD data and control signals are transmitted across five twisted wire pairs. A video controller integrated circuit on the motherboard 112 generates a pixel clock signal that serves as the pixel clock. This pixel clock is transmitted to the remote readout device 106 across its own twisted wire pair. On the motherboard 132 of the remote readout device 106, the pixel clock is used internal to the LVDS receiver 134 for reception and demultiplexing of the LCD data and control signals.

The LVDS transmitter 118 of the remote readout device 106 is capable of multiplexing up to 28 single channels onto four differential lines as mentioned above. The matched LVDS receiver 134 restores the four differential lines back to the 28 individual channels with minimized signal skew. The receiver 134 also restores the pixel clock signal as well. No verification of LCD data or control signals received by the remote readout device 106 is sent back to the host readout device 104. Through software, it is possible to make brightness adjustments at either readout device 104, 106 to affect the display 108 of either the host readout device 104 or the remote readout device 106. The motherboard 112 on the host readout device 104 monitors and generates separate DATA and BUSY signals from both the host readout device 104 and the remote readout device 106. Thus, the host readout device 104 sends video image data to the remote video device 106 so that the video image data is shown on the display 108. The host readout device 104 processes the image and the remote readout device 106 does not process the image in any way.

Once the host readout device 104 and the remote readout device 106 are both powered on and in communication with one another via the cable 128, the host readout device 104 automatically monitors the keyboards 110 of the readout devices 104 and 106. Thus, the host readout device 104 can be controlled by the keyboard 110 of either the host readout device 104 or the remote readout device 106.

Two twisted wire pairs are used for operating the keyboard or keypad of the remote readout device 106. One twisted pair is used to send data and the other is used to receive data. The twisted pair wires are terminated with RS-232 receiver/driver pair wide jumpers to select for data orientation. A BUSY signal is sent to the PIC microcontroller 122 on the keyboard 110 of the remote readout device 106 from the motherboard 112 of the host readout device 104. A DATA signal is then sent from the PIC microcontroller on the keyboard 110 of the remote readout device 106 to motherboard 112 of the host readout device 104. An RS-422 compliant transceiver integrated circuit is used to facilitate the BUSY and DATA signals between the two readout devices 104 and 106. Thus, the host readout device 104 monitors both keyboards 110 of the readout devices 104 and 106 so that the host readout device 104 can be controlled by either keyboard since each keyboard has identical functions or features. In addition, the video display information shown on both displays 108 of the readout devices 104 and 106 are identical at all times and respond appropriately at the same time. The above properties regarding the keyboards and displays is accomplished in part because the motherboard 132 of the remote readout device 106 is configured such that it only receives display data and transmits keyboard data. In addition, the remote readout device 106 provides access to the host readout device 104 from a second location. The remote readout device 106 thus operates interchangeably with and acts the same as the host readout device 104.

The foregoing detailed description is merely illustrative of several physical embodiments of the invention. Physical variations of the invention, not fully described in the specification, may be encompassed within the purview of the claims. For example, two or more remote readout devices can be used in conjunction with the host readout device to provide greater control for even larger/longer devices. In this example, the remote readout devices are either each connected directly to the host readout device or are connected in series with one another and the host readout device. Accordingly, any narrower description of the elements in the specification should be used for general guidance, rather than to unduly restrict any broader descriptions of the elements in the following claims.

We claim:

1. A position display system for displaying a position of a device, comprising:
   a device;
   a position measuring device that measures a position of said device;
   a host readout device that is mounted at a first location, wherein said host readout device receives a signal from said position measuring device that is representative of a position of said device, wherein said host readout device comprises:
      a display that displays an image representative of said position of said device; and
      a first power switch; and
   a remote readout device that is mounted at a second location, wherein said remote readout device comprises:
      a display that displays said image; and
      a second power switch, wherein turning on said first power switch while turning off said second power switch only allows said host readout device to operate.

2. The position display system of claim 1, wherein said device comprises a machine tool.

3. The position display system of claim 1, wherein turning off said first power switch renders both said host readout device and said remote readout device inoperative regardless of whether said second power switch is turned on or off.

4. The position display system of claim 1, wherein brightness of said image at said display of said host readout device can be adjusted and brightness of said image at said display of said remote readout device can be adjusted independently of said brightness adjustment made at said display of said host readout display.

5. The position display system of claim 1, further comprising a cable that is connected with said host readout device and said remote readout device, said host readout device transmitting a signal representative of said image to said remote readout device via said cable.

6. The position display system of claim 1, wherein said image is displayed substantially simultaneously on said display of said host readout device and said display of said remote readout device.

7. The position display system of claim 1, wherein said remote readout device comprises a keypad that controls said host readout device.

8. The position display system of claim 7, wherein said host readout device comprises a keypad that controls said host readout device, wherein said host readout device monitors said keypad of said remote keypad device and said keypad of said host keypad device.

9. The position display system of claim 1, wherein said image displayed on said display of said remote readout device is processed solely by said host readout device.

10. A position display system for displaying a position of a device, comprising:
    a device;
    a position measuring device that measures a position of said device;
    a host readout device that is mounted at a first location, wherein said host readout device receives a signal from said position measuring device that is representative of a position of said device, wherein said host readout device comprises:
       a display that displays an image representative of said position of said device; and
       a first power switch; and
    a remote readout device that is mounted at a second location, wherein said remote readout device comprises:
       a display and a keypad that controls said host readout device; and
       a second power switch, wherein turning on said first power switch while turning off said second power switch only allows said host readout device to operate.

11. The position display system of claim 10, wherein turning off said first power switch renders both said host readout device and said remote readout device inoperative regardless of whether said second power switch is turned on or off.

12. The position display system of claim 10, wherein said device comprises a machine tool.

13. The position display system of claim 10, further comprising a cable that is connected with said host readout device and said remote readout device, said host readout device transmitting a signal representative of said image to said remote readout device via said cable.

14. The position display system of claim 10, wherein said host readout device comprises a keypad that controls said host readout device, wherein said host readout device monitors said keypad of said remote keypad device and said keypad of said host keypad device.

15. A position display system for displaying a position of a device, comprising:
    a device;
    a position measuring device that measures a position of said device;
    a host readout device that is mounted at a first location, wherein said host readout device receives a signal from said position measuring device that is representative of a position of said device, wherein said host readout device comprises:
       a display that displays an image representative of said position of said device; and
       a first power switch; and
    a remote readout device that is mounted at a second location, wherein said remote readout device comprises:
       a display that displays said image; and
       a second power switch, wherein turning off said first power switch renders both said host readout device and said remote readout device inoperative regardless of whether said second power switch is turned on or off.

16. The position display system of claim 15, wherein said device comprises a machine tool.

17. The position display system of claim 15, further comprising a cable that is connected with said host readout device and said remote readout device, said host readout device transmitting a signal representative of said image to said remote readout device via said cable.

18. The position display system of claim 15, wherein said image is displayed substantially simultaneously on said display of said host readout device and said display of said remote readout device.

19. The position display system of claim 15, wherein said remote readout device comprises a keypad that controls said host readout device.

20. The position display system of claim 19, wherein said host readout device comprises a keypad that controls said host readout device, wherein said host readout device monitors said keypad of said remote keypad device and said keypad of said host keypad device.

21. The position display system of claim 15, wherein said image displayed on said display of said remote readout device is processed solely by said host readout device.

22. The position display system of claim 15, wherein turning on said first power switch while turning off said second power switch only allows said host readout device to operate.

23. The position display system of claim 15, wherein brightness of said image at said display of said host readout device can be adjusted and brightness of said image at said display of said remote readout device can be adjusted independently of said brightness adjustment made at said display of said host readout display.

24. A position display system for displaying a position of a device, comprising:

a device;

a position measuring device that measures a position of said device;

a host readout device that is mounted at a first location, wherein said host readout device receives a signal from said position measuring device that is representative of a position of said device, wherein said host readout device comprises:

a display that displays an image representative of said position of said device; and a first power switch; and a remote readout device that is mounted at a second location, wherein said remote readout device comprises:

a display and a keypad that controls said host readout device; and a second power switch, wherein turning off said first power switch renders both said host readout device and said remote readout device inoperative regardless of whether said second power switch is turned on or off.

25. The position display system of claim 24, wherein said device comprises a machine tool.

26. The position display system of claim 24, further comprising a cable that is connected with said host readout device and said remote readout device, said host readout device transmitting a signal representative of said image to said remote readout device via said cable.

27. The position display system of claim 24, wherein said host readout device comprises a keypad that controls said host readout device, wherein said host readout device monitors said keypad of said remote keypad device and said keypad of said host keypad device.

28. The position display system of claim 24, wherein turning on said first power switch while turning off said second power switch only allows said host readout device to operate.

* * * * *